US006685480B2

(12) United States Patent
Nishimoto et al.

(10) Patent No.: US 6,685,480 B2
(45) Date of Patent: Feb. 3, 2004

(54) PHYSICAL MOTION STATE EVALUATION APPARATUS

(75) Inventors: Tetsuo Nishimoto, Hamamatsu (JP); Toshiyuki Iwamoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 267 days.

(21) Appl. No.: 09/816,945

(22) Filed: Mar. 23, 2001

(65) Prior Publication Data

US 2001/0034014 A1 Oct. 25, 2001

(30) Foreign Application Priority Data

Mar. 24, 2000 (JP) ........................................ 2000-083533

(51) Int. Cl.[7] ................................................ G09B 9/00
(52) U.S. Cl. ........................ 434/247; 434/250; 434/365; 463/7; 463/36; 482/8
(58) Field of Search ................................. 434/247, 250, 434/307 R–309, 365; 463/4, 6, 7, 23, 30, 31, 33, 36; 482/4, 8; 73/379.04; 345/156; 250/221

(56) References Cited

U.S. PATENT DOCUMENTS

| | | | | | |
|---|---|---|---|---|---|
| 4,720,789 | A | * | 1/1988 | Hector et al. | 463/33 |
| 5,139,261 | A | * | 8/1992 | Openiano | 463/36 |
| 5,229,756 | A | * | 7/1993 | Kosugi et al. | 345/156 |
| 5,414,256 | A | * | 5/1995 | Gurner et al. | 250/221 |
| 5,423,554 | A | * | 6/1995 | Davis | 463/4 |
| 5,649,861 | A | * | 7/1997 | Okano et al. | 463/30 |
| 5,713,794 | A | * | 2/1998 | Shimojima et al. | 463/36 |
| 5,890,995 | A | * | 4/1999 | Bobick et al. | 482/4 |
| 6,225,977 | B1 | * | 5/2001 | Li | 345/156 |
| 6,227,968 | B1 | * | 5/2001 | Suzuki et al. | 463/7 |
| 6,227,974 | B1 | * | 5/2001 | Eilat et al. | 463/40 |
| 6,270,414 | B2 | * | 8/2001 | Roelofs | 463/36 |
| 6,379,249 | B1 | * | 4/2002 | Satsukawa et al. | 463/31 |
| 6,430,997 | B1 | * | 8/2002 | French et al. | 73/379.04 |
| 6,450,886 | B1 | * | 9/2002 | Oishi et al. | 463/36 |
| 6,471,586 | B1 | * | 10/2002 | Aiki et al. | 463/6 |
| 2001/0016510 | A1 | * | 8/2001 | Ishikawa et al. | 463/7 |
| 2002/0055383 | A1 | * | 5/2002 | Onda et al. | 463/36 |

FOREIGN PATENT DOCUMENTS

| JP | 3003851 | 11/1999 |
|---|---|---|
| JP | 2000-325664 | 2/2000 |

* cited by examiner

*Primary Examiner*—Joe H. Cheng
(74) *Attorney, Agent, or Firm*—Morrison & Foerster LLP

(57) ABSTRACT

A physical motion state evaluation apparatus is configured by a foot switch unit for detecting user's step motions, physical motion state detectors for detecting motions of prescribed parts (e.g., hands, foot) of a user's body, a display and a musical tone generator. Herein, the physical motion state detector is configured by a projector unit for projecting optical beams along optical axes and a receiver unit for receiving the optical beams respectively, so that the receiver unit detects a shutoff event in which the prescribed part of the user's body shuts off at least one of the optical beams. Physical motion state instructions request a user to move the prescribed parts of the user's body to instructed positions at instruction timings respectively, so that the physical motion state detectors provide detection timings at which the prescribed parts of the user's body are precisely moved to the instructed positions in conformity with the instruction timings. Based on deviation values between the instruction timings and detection timings, the apparatus produces evaluation results on user's physical motion states in comparison with the physical motion state instructions. The evaluation results can be visually presented on a screen of the display as scores being marked for the user's physical motion states, or they can be subjected to auditory presentation in which the musical tone generator sequentially generates musical tones corresponding to constituent notes of a melody in response to the detection timings that belong to tone generation ranges of the instruction timings.

34 Claims, 10 Drawing Sheets

FIG. 11A LED-L (91a)
FIG. 11B LED-R (92a)
FIG. 11C CAMERA (81, 82)

PHYSICAL MOTION STATE EVALUATION APPARATUS

BACKGROUND OF THE INVENTION

1. Field of the Invention

This invention relates to physical motion state evaluation apparatuses for use in dance-type music games and rehabilitation support training in which evaluation is performed on the motion of parts of the human body in response to physical motion state instructions.

2. Description of the Related Art

Recently, many players play music games such as dance music games and music play games in accordance with music and visual images on screens of computer displays. Herein, the players perform dance steps in response to instructions given from computer game devices, or they play music controllers imitating drums, guitars and keyboards to play music performance in response to instructions given from computer game devices. Thus, the computer game devices perform evaluation on the player's dance steps or music performance in comparison with instructed timings.

Conventional dance music games are designed such that the players merely step on or depress mechanical switches with their feet in synchronization with music. Conventional music play games are designed such that the players merely touch or press switches on the music controllers (e.g., drum pads, guitar-like controllers and keys of keyboards) with their hands (or fingers). Until now, no music games are provided to allow the players using both hands and feet simultaneously.

Particularly, the dance music games allow the players to use their feet only, so the players could not enjoy performing dance steps to demonstrate their advanced skills in dancing. Because conventional dance music games are basically designed to suit to beginner's levels in dancing, even if the players make clumsy motions in dancing, it may be possible for such players to obtain high scores in the evaluation of their dancing abilities. Some players attempt to imitate movements of famous singers who sing songs with designed movements on television programs, for example. However, those players are not always satisfied with conventional dance music games that are not designed to use player's motions of hands (or fingers) as evaluation subjects. Because the dance music games merely provide touch sensors using mechanical switches to sense the dance steps of the players, it is difficult to perform precise evaluation on the free physical motions of the players, so the players would have feelings of wrongness (or dissatisfaction) in playing the dance music games.

In the case of physical (training) therapy in rehabilitation, for example, persons (e.g., aged persons, handicapped persons, or persons after illness or injuries) may be able to restore physical abilities by moving parts of their bodies. It may be desirable that machines or devices for use in rehabilitation or medical exercises are designed to cope with the free hand motions of the aforementioned persons.

SUMMARY OF THE INVENTION

It is an object of the invention to provide a physical motion state evaluation apparatus that reflects various types of motions such as hand motions and foot motions (or kicking motions), which cannot be precisely detected by mechanical sensors, on evaluation results for player's physical motion states.

A physical motion state evaluation apparatus is configured by a foot switch unit for detecting user's step motions, physical motion state detectors for detecting motions of prescribed parts (e.g., hands, foot) of a user's body, a display and a musical tone generator. Herein, each of the physical motion state detector is configured by a projection unit for projecting optical beams along optical axes and a receiver unit for receiving the optical beams respectively, so that the receiver unit detects a shutoff event (or blocking event) in which the prescribed part of the user's body shuts off (or blocks) at least one of the optical beams. For example, the physical motion state detectors detect user's hand motions in which the user's left and/or right hand moves to upward, forward, backward, left and right positions respectively, or the physical motion state detector detects a user's kick motion in which the user raises his/her foot forward in kicking.

Physical motion state instructions, which are displayed on a screen of the display, request a user to move the prescribed parts of the user's body to instructed positions at instruction timings respectively, so that the physical motion state detectors provide detection timings at which the prescribed parts of the user's body are precisely moved to the instructed positions in conformity with the instruction timings. Based on deviation values between the instruction timings and detection timings, the apparatus produces evaluation results on user's physical motion states in comparison with the physical motion state instructions.

The evaluation results can be visually presented on the screen of the display as scores being marked for the user's physical motion states. Alternatively, the evaluation results can be subjected to auditory presentation in which the musical tone generator sequentially generates musical tones corresponding to constituent notes of a melody in response to the detection timings that belong to tone generation ranges of the instruction timings. Thus, the user is able to recognize errors in his/her physical motion states by listening to whether the melody is played incorrectly.

BRIEF DESCRIPTION OF THE DRAWINGS

These and other objects, aspects and embodiment of the present invention will be described in more detail with reference to the following drawing figures, of which:

FIG. 11A is a time chart showing light emission periods of a LED-L attached to a left hand grip;

FIG. 11B is a time chart showing light emission periods of a LED-R attached to a right hand grip;

FIG. 11C is a time chart showing photographing periods of digital cameras;

DESCRIPTION OF THE PREFERRED EMBODIMENTS

This invention will be described in further detail by way of examples with reference to the accompanying drawings.

Figure 1:
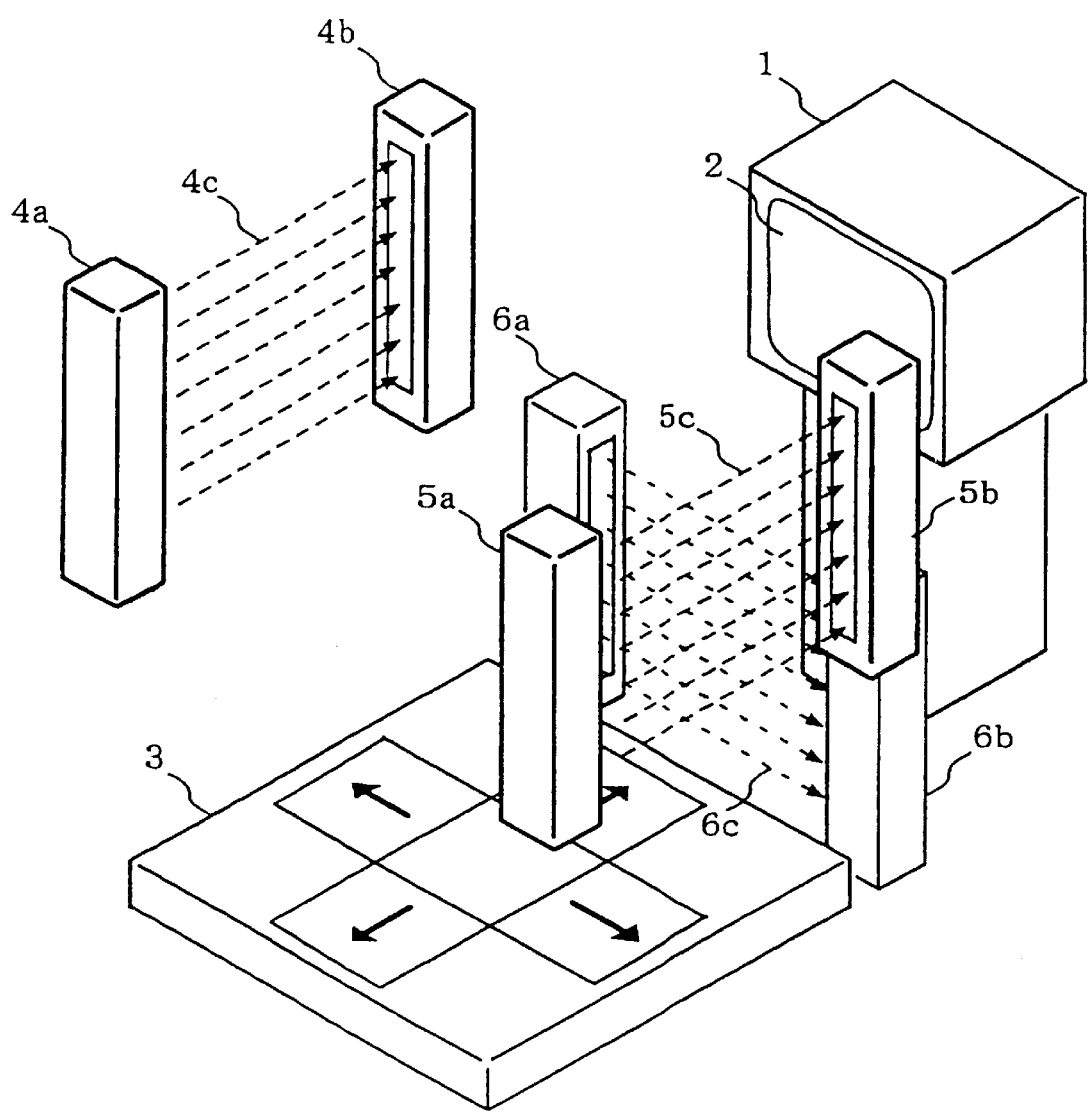
FIG. 1 is a perspective view showing an appearance of a physical motion state evaluation apparatus in accordance with a first embodiment of the invention.
Figure 2:
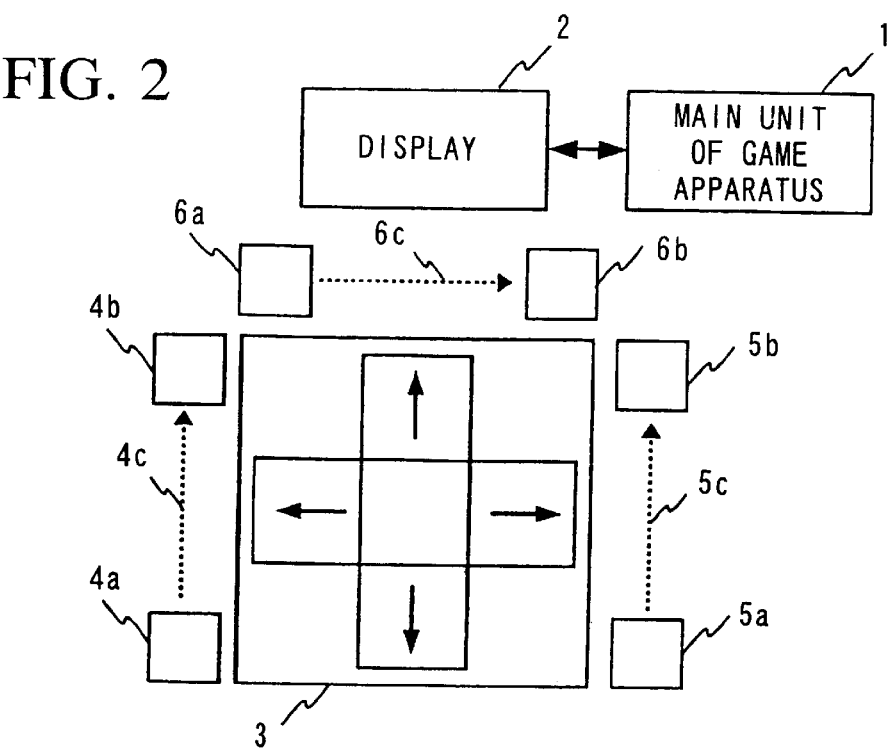
FIG. 2 is a plan view diagrammatically showing arrangement of essential parts of the physical motion state evaluation apparatus of the first embodiment.

FIG. 1 shows an appearance of a physical motion state evaluation apparatus in accordance with a first embodiment of the invention. FIG. 2 diagrammatically shows a plan view of the physical motion state evaluation apparatus.

The physical motion state evaluation apparatus is designed to perform physical motion state sensing on at least one specific part of a user's body by light sensing techniques. That is, the motion of the prescribed part of the user's body is sensed by detecting shutoff of light beams being arranged between prescribed units of the apparatus.

The present embodiment describes the physical motion state evaluation apparatus as an example of a dance music game apparatus. Namely, a reference numeral 1 designates a main unit of the game apparatus, and a reference numeral 2 designates a display that provides a user (or player) with a criterion of sensing of physical motion states and model motions being sensed and that also shows points of scores being marked for user's physical motions. A reference numeral 3 designates a foot switch unit for detecting step positions for user's feet. FIGS. 1 and 2 show merely an example of an arrangement of foot switches in the foot switch unit 3, which is constructed as a floor unit whose surface area are divided into multiple areas using four arrows directing forward, backward, left and right positions respectively. Each of rectangular areas designated by the four arrows provides a foot switch such as a sheet-like contact switch or a pressure-sensitive switch. If the user applies a foot motion on a specific area of the foot switch unit 3, its corresponding foot switch is turned on so that the apparatus detects a foot step state in user's motion.

The present embodiment employs transmission type sensors, which are embodied by three pairs of sensing units 4a, 4b, 5a, 5b, 6a, 6b. Each pair of the sensing units are arranged at prescribed positions and spaced apart from each other by a prescribed distance, between which optical beams are vertically arranged along prescribed optical axes respectively. That is, each pair of the sensing units are designed to detect existence and timing of an object that shuts off an optical axis (or optical axes) therebetween. For example, they detect a hand motion or a kick motion of the user. Concretely speaking, a pair of the sensing units 4a, 4b are provided for detection of a motion of a user's left hand that moves leftwards; a pair of the sensing units 5a, 5b are provided for detection of a motion of a user's right hand that moves rightwards; and a pair of the sensing units 6a, 6b are provided for detection of a motion of a user's foot that moves forward in kicking.

It may be possible to use a pad sensor in which a user moves his/her hand to touch a pad so that its position is being detected. However, because the user may have feeling of wrongness in using such a pad sensor that needs touches on pads by the user's hand, the present embodiment employs the non-contact type sensing technique, namely the transmission type sensor for detecting an event in which the user's hand reaches a prescribed position. Thus, the user does not have feeling of wrongness in moving parts of his/her body because of the non-contact type sensing technique.

Because the transmission type sensor is designed such that multiple optical axes are vertically arranged between a pair of the sensing units and differ from each other in elevation, it is possible to detect moving speed in addition to the position with respect to the object that shuts off the optical axis (or optical axes). Incidentally, it is possible to sequentially or periodically change light projecting duration with respect to each optical axis. That is, it is possible to perform scanning between a pair of the sensing units.

Specifically, a first pair for use in detection of a motion of a user's left hand consists of a projector unit 4a for projecting light and a receiver unit for receiving the light, a second pair for use in detection of a motion of a user's right hand consists of a projector unit 5a for projecting light and a receiver unit 5b for receiving the light, and a third pair for use in detection of a (kick) motion of a user's foot consists of a projector unit 6a for projecting light and a receiver unit 6b for receiving the light.

Figure 3:
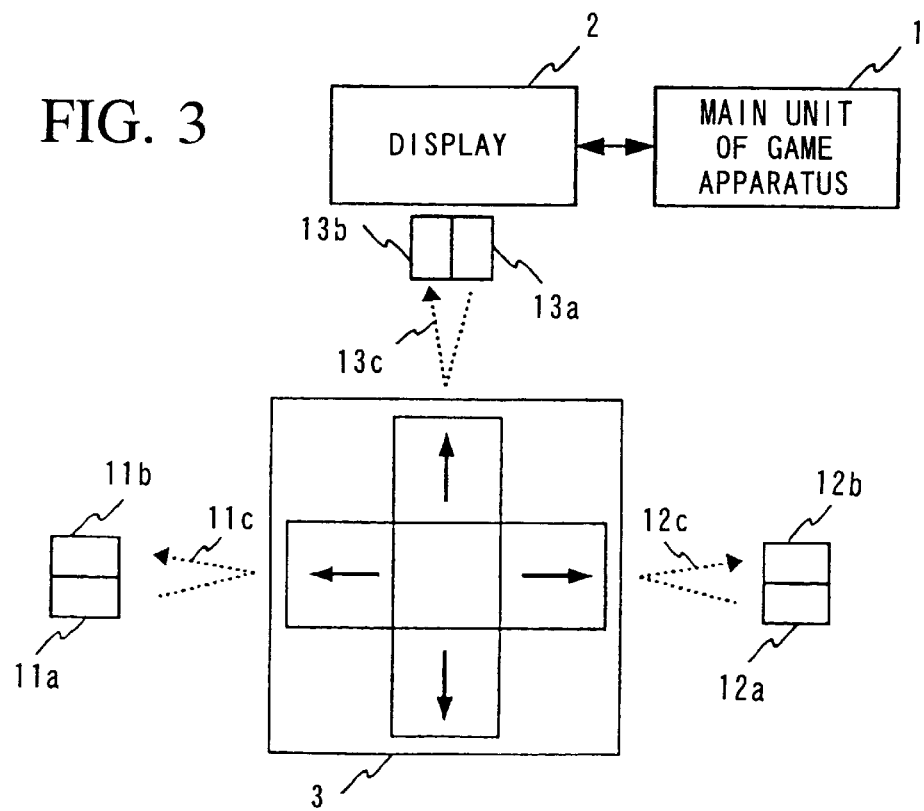
FIG. 3 is a plan view diagrammatically showing arrangement of essential parts of the physical motion state evaluation apparatus in accordance with a second embodiment of the invention.

FIG. 3 diagrammatically shows a plan view of the physical motion state evaluation apparatus in accordance with a second embodiment of the invention. As compared with the aforementioned first embodiment, the second embodiment is designed such that a user's physical motion state is detected based on reflected light being reflected by at least one specific part of a user's body. In the second embodiment shown in FIG. 3, parts identical to those of the first embodiment shown in FIGS. 1 and 2 are designated by the same reference numerals, hence, the description thereof will be omitted.

As compared with the first embodiment using the transmission type sensors, the second embodiment is characterized by using reflection type sensors, which are denoted by reference numerals 11, 12 and 13. That is, three reflection type sensors are arranged to encompass the foot switch unit 3 in plan view such as to perform detection on motions of user's left hand, user's right hand and user's foot. Specifically, first one for use in detection of the motion of the user's left hand consists of a projector unit 11a for projecting light and a receiver unit 11b for receiving reflected light reflected on the user's left hand, a second one for use in detection of the motion of the user's right hand consists of a projector unit 12a for projecting light and a receiver unit 12b for receiving reflected light reflected on the user's right hand, and third one for use in detection of the (kick) motion of the user's foot consists of a projector unit 13a for projecting light and a receiver unit 13b for receiving reflected light reflected on the user's foot.

FIG. 3 shows such that each reflection type sensor uses a single optical axis along which the projector unit projects light to be received by the receiver unit, wherein the reflection type sensor merely detects a position of an object shutting off the optical axis. Of course, the reflection type sensor is designed to provide multiple optical axes that are vertically arranged and differ from each other in elevation. In that case, it is possible to detect a size of the object shutting off the optical axes in addition to the position. Incidentally, it is possible to realize scanning on the object by sequentially or periodically changing light projecting duration with respect to each optical axis of the reflection type sensor. In addition, it is possible to realize changeover scanning by which the reflection type sensors are mutually changed over in light projecting duration to avoid mutual interference of reflected light.

The first and second embodiments use optical sensors for detection of user's physical motions. Of course, it is possible to employ other types of sensors such as electromagnetic sensors and ultrasonic sensors that are designed to detect physical motions of human bodies.

Figure 4:
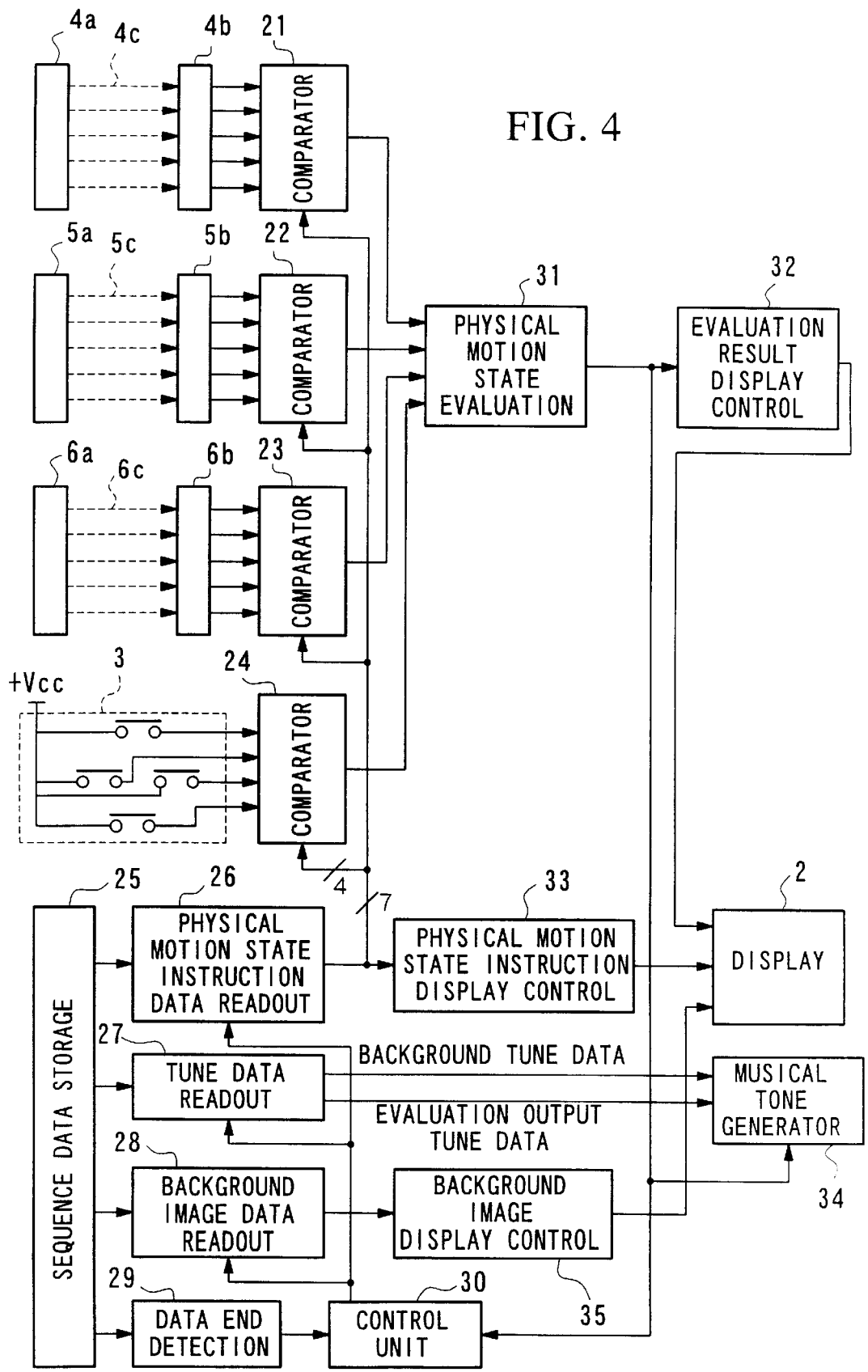
FIG. 4 is a block diagram showing an electric configuration of the physical motion state evaluation apparatus of the first embodiment.

FIG. 4 is a block diagram showing an electric configuration of the physical motion state evaluation apparatus in accordance with the first embodiment of the invention, wherein the aforementioned parts shown in FIGS. 1 and 2 are designated by the same reference numerals, hence, the description thereof will be omitted.

All of the units 4a, 4b, 5a, 5b, 6a, 6b of the aforementioned transmission type sensors are controlled in light projecting timing and light receiving timing by a control unit 30. Namely, the receiver units 4b, 5b and 6b performs optical detection with respect to each of optical axes. Therefore, each of them provides optical detection outputs in connection with the optical axes respectively. Optical detection outputs of the receiver unit 4b are supplied to a comparator 21. Optical detection outputs of the receiver unit 5b are supplied to a comparator 22. Optical detection outputs of the receiver unit 6b are supplied to a comparator 23. In addition, the aforementioned foot switch unit 3 provides four foot switches for detection of step motions of user's feet with respect to the four directions, namely forward, backward, left and right directions indicated by the arrows. Outputs of the four foot switches are supplied to a comparator 24.

A sequence data storage 25 is used to provide the user with instructions regarding physical motion states, details of which will be described later with reference to FIGS. 6A–6D. Hence, the sequence data storage 25 stores physical motion state instruction data for displaying the instructions on the screen of the display 2. In addition, the sequence data storage 25 also stores background tune data for use in generation of musical tone signals of musical tunes, evaluation output tune data for use in presentation of evaluation results in an auditory manner using prescribed musical tunes, and background image data for use in display of background images on the screen of the display 2. Incidentally, it is possible to incorporate accompanying data into the physical motion state instruction data, wherein the accompanying data are used together with the evaluation output tune data to allow auditory presentation of evaluation results by changing generation manners of musical tone signals.

All of the aforementioned data are stored in the sequence data storage 25 in connection with a common reference time. That is, each data contains reference time data or duration data (or time interval data). It is possible to provide multiple data sets within sequence data of a same musical tune in response to various types of elements such as rhythms and musical performance levels.

As the sequence data storage 25, it is possible to use various types of storage media, namely ROM cartridges which can be freely attached to or detached from the apparatus, flexible magnetic disks (or floppy disks), optical disks such as CD-ROMs, and hard disk drives, for example.

The aforementioned data of the sequence data storage 25 are respectively read out by specific readout sections, namely a physical motion state instruction data readout section 26, a tune data readout section 27 and a background image data readout section 28, in synchronization with each other. The control unit 30 controls start timings of reading out musical tunes and readout positions of data being read out over a lapse of time. A data end detection section 29 is used to detect an end code contained in tune data such as background tune data and evaluation output tune data. That is, by reading an end code contained in the tune data, the data end detection section 29 detects and communicates an end of the tune data to the control unit 30.

The physical motion state instruction data readout section 26 delivers the physical motion state instruction data to a physical motion state instruction display control section 33 coupled with the display 2. In addition, the physical motion state instruction data are divided into left hand position instruction data, right hand position instruction data, kick motion instruction data and step motion instruction data, which are respectively delivered to the comparators 21, 22, 23 and 24. The physical motion state instruction display control section 33 controls the display 2 to visually display prescribed symbols and figures such as arrows for instructing physical motion states on the screen. The present embodiment is not necessarily limited such that the physical motion state instructions are made in a visual manner. That is, it is possible to use auditory instructions for producing instructive voice or sound instructing the physical motion states. Or, it is possible to use both of the visual instructions and auditory instructions.

As the tune data, the tune data readout section 27 supplies the background tune data and evaluation output tune data to a musical tone generator 34, by which prescribed musical tunes are generated. The evaluation output tune data are used for the purpose of auditory presentation of evaluation results by which player's physical motion states are evaluated by changing generation manners of musical tone signals. Details of the auditory presentation will be described later with reference to FIGS. 6A–6D and FIGS. 7A–7E. The background image data readout section 28 supplies the background image data to a background image display control section 35 coupled with the display 2. That is, the display 2 receives an output of the physical motion state instruction display control section 33 and an output of the background image display control section 35 as well as an output of an evaluation result display control section 32, which will be described later. Thus, the display 2 combines those outputs together to display composite images on the screen.

The comparator 21 compares a player's left hand position detected by the receiver unit 4b with an instructed left hand position designated by the left hand position instruction data given from the physical motion state instruction data readout section 26.

The comparator 22 compares a player's right hand position detected by the receiver unit 5b with an instructed right hand position designated by the right hand position instruction data given from the physical motion state instruction data readout section 26. The comparator 23 compares a player's foot position in kicking detected by the receiver unit 6b with an instructed foot position designated by the kick motion instruction data given from the physical motion state instruction data readout section 26. Further, the comparator 24 compares a player's step position (namely, one of forward, backward, left and right positions) detected by the foot switch unit 3 with an instructed step position designated by the step motion instruction data given from the physical motion state instruction data readout section 26.

The aforementioned comparators 21 to 24 do not only detect positional deviations but also detect time deviations between detection timings and instruction timings. That is, each comparator also detect a time deviation between a detection timing for detecting a prescribed physical motion of the player and an instruction timing at which the physical motion state instruction data readout section 26 outputs a corresponding physical motion instruction thereto.

Comparison results of the comparators 21 to 24 are supplied to a physical motion state evaluation section 31. Based on the comparison results indicating differences between motion states of prescribed parts of the player's body and instructed physical motion states, the physical motion state evaluation section 31 performs evaluation on the player's physical motion states to provide evaluation results, which are forwarded to the evaluation result display control section 32. Herein, the evaluation results are converted to scores, which are displayed on the screen of the display 2.

The present embodiment basically describes detection with respect to all of physical motion states, namely left and right hand positions and foot positions. The present embodiment can be easily modified such that detection is performed only on the foot positions or hand positions. Alternatively, the present embodiment is modified such that detection is performed only on a left side or right side of the player's body. Or, it is possible to modify the present embodiment such that an arbitrarily selected part is to be selectively subjected to detection.

As the physical motion state instruction data, it is possible to provide multiple instruction data sets in response to degrees of difficulty representing a practice use, a beginner's level or else. This allows the user to manually select one of the multiple instruction data sets that are stored in the sequence data storage 25 in advance. Or, it is possible to configure the apparatus such that the control section 30 automatically selects one of the multiple instruction data sets in response to evaluation results given from the physical motion state evaluation section 31.

It is possible to actualize various types of instructions in response to degrees of difficulty by using only a single instruction data set. That is, difficulty-related controls are made by reducing hard instruction timings from among instruction timings being read from the single instruction data set, or they are made by shifting the hard instruction timings to become easier, for example.

If the multiple instruction data sets are stored in the sequence data storage 25 to suit to various degrees of difficulty, the apparatus proceeds to a music game in response to a specific degree of difficulty. In that case, it is possible to change the degree of difficulty in response to evaluation results marked by the physical motion state evaluation section 31 during the music game in progress.

It is possible to change readout speeds of various data such as the physical motion state instruction data stored in the sequence data storage 25 in response to evaluation results during the music game in progress. For example, the apparatus automatically changes the physical motion instructions and a tempo (or progression speed) of a musical tune being played in response to the evaluation results. That is, the tempo is increased faster if the evaluation results are good, while the tempo is decreased slow if the evaluation results are not so good.

In response to evaluation results, the apparatus controls the musical tone generator 34 to effect transposition together with production of prescribed sound. That is, if the evaluation results are not so good during the music game in progress, the apparatus produces booing sound while transposition is effected such that musical tones of the background tune data are decreased in pitches. If the evaluation results are good, the apparatus produces handclap sound while transposition is effected such that musical tones of the background tune data are increased in pitches.

Figure 5:
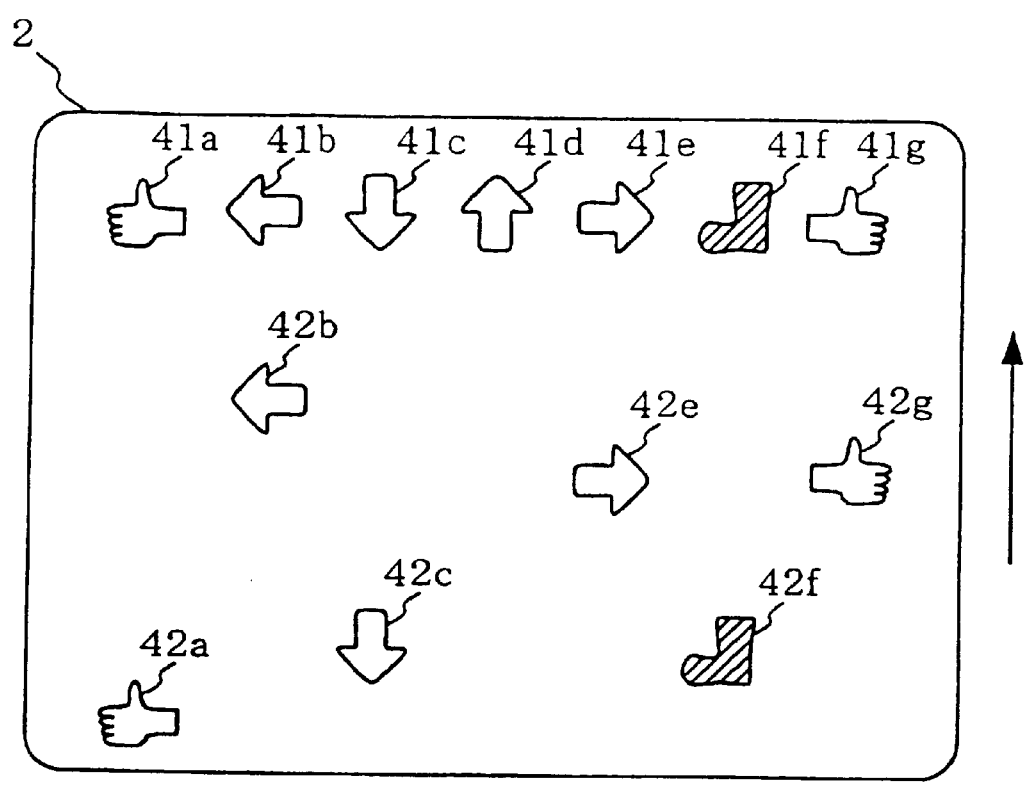
FIG. 5 shows an example of a display image being displayed on a screen of a display to show physical motion state instructions.

FIG. 5 shows an example of a display image being displayed on the screen of the display 2 in accordance with the first embodiment of the invention, wherein a background image is omitted for simplification of illustration. Reference numerals 41a to 41g designate fixed symbols corresponding to small still pictures or icons that are aligned linearly on a top place of the screen. Namely, a fixed symbol (or left hand sign) 41a instructs the player to move his/her left hand leftwards; a fixed symbol (or leftward arrow) 41b instructs the player to move his/her foot to a left step position on the foot switch unit 3; a fixed symbol (or backward arrow) 41c instructs the player to move his/her foot to a backward step position on the foot switch unit 3; a fixed symbol (or forward arrow) 41d instructs the player to move his/her foot to a forward step position on the foot switch unit 3; a fixed symbol (or rightward arrow) 41e instructs the player to move his/her foot to a right step position on the foot switch unit 3; a fixed symbol (or hatched or dark-colored foot sign) 41f instructs the player to raise his/her foot upwards by kicking; and a fixed symbol (or right hand sign) 41g instructs the player to move his/her right hand rightwards.

In FIG. 5, reference numerals 42a–42c and 42e–42g designate symbols representing physical motion state instructions, which scroll vertically on the screen over a lapse of time. The aforementioned symbols are examples of physical motion state instruction symbols, all of which are not shown in FIG. 5 for simplification of illustration. Specifically, a physical motion state instruction symbol (or left hand sign) 42a instructs the player to move his/her left hand leftwards; a physical motion state instruction symbol (or leftward arrow) 42b instructs the player to move his/her foot to a left step position on the foot switch unit 3; a physical motion state instruction symbol (or backward arrow) 42c instructs the player to move his/her foot to a backward step position on the foot switch unit 3; a physical motion state instruction symbol (or rightward arrow) 42e instructs the player to move his/her foot to a right step position on the foot switch unit 3; a physical motion state instruction symbol (or hatched or dark-colored foot sign) 42f instructs the player to move his/her foot forward in kicking; and a physical motion state instruction symbol (or right hand sign) 42g instructs the player to move his/her right hand rightwards.

Each of the aforementioned physical motion state instruction symbols scroll upwards at an uniform speed towards each of the fixed symbols on the screen. At a timing at which the physical motion state instruction symbol scrolls upwards to overlap with the corresponding fixed symbol, the player is instructed to carry out the instructed physical motion.

Figures 6A, 6B, 6C, 6D:
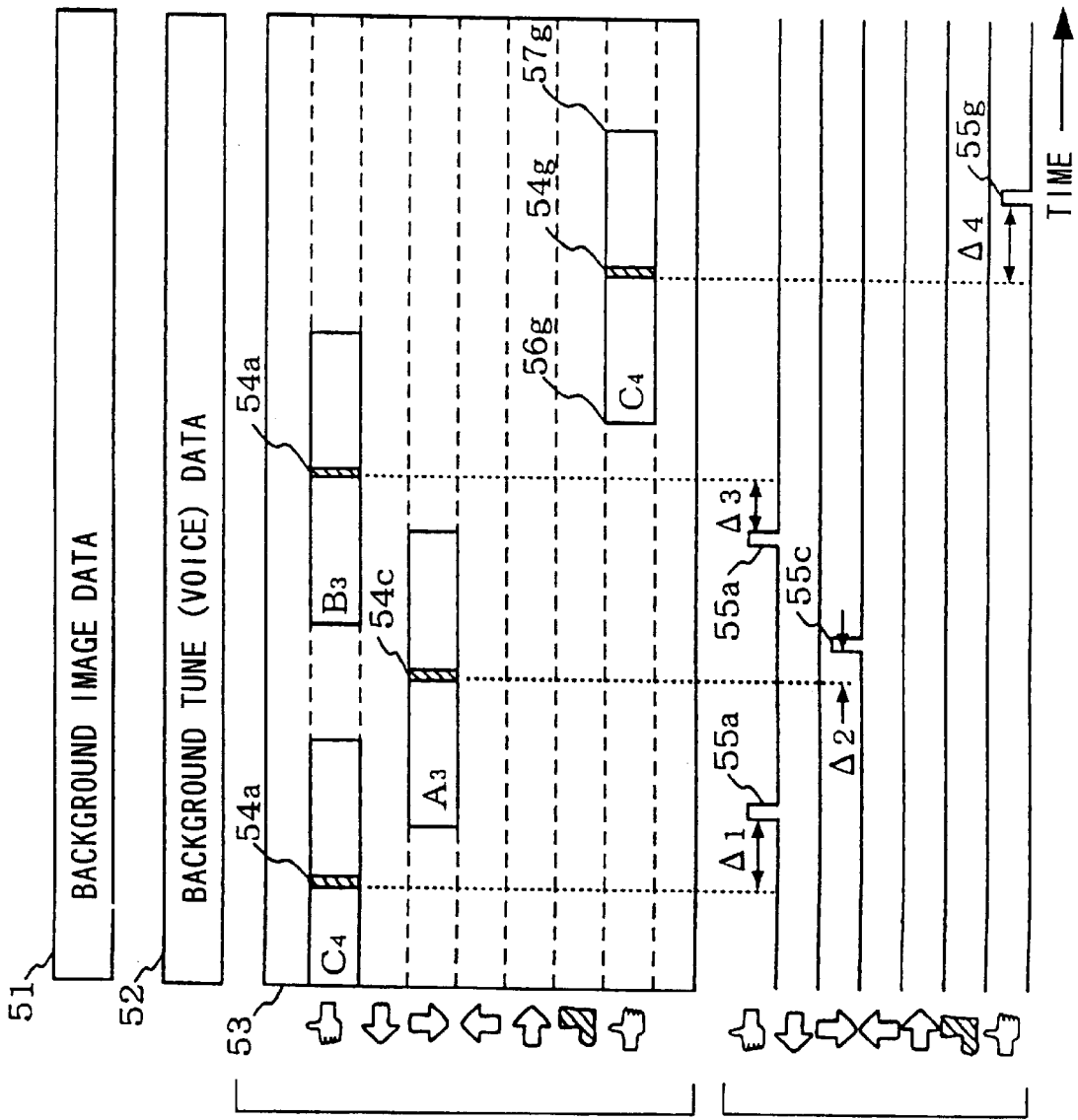
FIG. 6A shows background image data read from a sequence data storage shown in FIG. 4.
FIG. 6B shows background tune data read from the sequence data storage.
FIG. 6C shows seven physical motion state instruction data read from the sequence data storage.
FIG. 6D shows seven trigger signals indicating detection on the seven physical motion states of prescribed parts of the player's body.

Actual physical motion states of the player are compared with instructed physical motion states with regard to prescribed parts (e.g., hands and/or feet) of the player's body. Comparison between them will be described in detail with reference to FIGS. 6A–6D in accordance with the first embodiment of the invention. FIGS. 6A and 6B respectively show background image data 51 and background tune data (or voice data) 52, both of which are read from the sequence data storage 25. Herein, the tune data are made by specific coding in form of SMF data (where "SFM" is an abbreviation for "Standard Musical Instrument Digital Interface File"), or they are made in form of waveform data representing musical tone signals or voice signals.

FIG. 6C shows a set of seven physical motion state instruction data, all of which are encompassed within a time chart block 53. Herein, the seven physical motion state instruction data are provided with regard to prescribed parts of the player's body and are arranged along a same time axis. Namely, timing signals 54a are arranged in a time chart of the left hand sign and instruct the player to move his/her left hand leftwards. A timing signal 54c is arranged in a time chart of the backward arrow and instructs the player to move his/her foot to the backward step position on the foot switch unit 3. A timing signal 54g is arranged in a time chart of the right hand sign and instructs the player to move his/her right hand rightwards. FIG. 6C merely show examples of the timing signals that are arranged in three time charts within seven time charts corresponding to the seven physical motion state instruction data.

The seven physical motion state instruction data are configured by timing signals (i.e., time data or duration data) and physical motion state instruction codes. Herein, the time data (or duration data) of the seven physical motion state instruction data are separated from each other and are recorded on media by seven track areas. Or, both of the time data (or duration data) and physical motion state instruction codes are recorded on media in a same area.

The background tune data 52 are stored in form of SMF data, which correspond to MDI event data accompanied with duration data.

Picture data (e.g., background image data) are stored by units of picture frames. Therefore, it is possible to discriminate reproduction time of each frame by counting a number of frames or by incorporating time information into frames of the picture data.

FIG. 6D shows seven physical motion states of the player that are detected by the three transmission type sensors (namely, receiver units 4b, 5b, 6b) and four foot switches of the foot switch unit 3. That is, seven time charts respectively show trigger signals indicating detection timings for detecting the seven physical motion states of the player.

FIG. 6D merely shows examples of trigger signals whose pulses appear in three time charts within the seven time charts. Namely, trigger pulses 55a are arranged in a time chart of the left hand sign to detect that the player moves his/her left hand leftwards. A trigger pulse 55c is arranged in a time chart of the backward arrow to detect that the player moves his/her foot onto the backward step position on the foot switch unit 3. A trigger pulse 55g is arranged in a time chart of the right hand sign to detect that the player moves his/her right hand rightwards.

Player's step motions are detected by the foot switch unit 3 in which the foot switches are turned on. In addition, player's hand motions and kick motion are detected by the transmission type sensors using optical beams whose shutoff events are used to detect movements of player's hands and foot. That is, the apparatus makes determination as to whether a prescribed part of the player's body shuts off a specific optical axis or vertically adjacent optical axes of the transmission type sensor. Concretely speaking, left ward motion of the player's left hand is detected by the receiver unit 4b upon shutoff of the optical axis, rightward motion of the player's right hand is detected by the receiver unit 5b upon shutoff of the optical axis, and kick motion of the player's foot is detected by the receiver unit 6b upon shutoff of the optical axis.

Each of the transmission type sensors monitors variations of shutoff states of specific optical axes that are arranged vertically adjacent to each other. That is, if the shutoff states of the optical axes temporarily stop without variations or if the shutoff states of the optical axes vary in an opposite direction, the transmission type sensor detects that the prescribed part of the player's body temporarily stops moving or slightly reverses a moving direction. Thus, the apparatus recognizes that the player intentionally performs a physical motion state as instructed.

Comparison between the physical motion state instructions and actual physical motion states of the prescribed parts of the player's body is made by calculating deviations between physical motion state instruction timing signals and detection timings for detecting that the prescribed parts of the player's body are actually placed in instructed physical motion states.

According to FIGS. 6C and 6D, the player actually moves his/her left hand leftwards at detection timings corresponding to the trigger pulses 55a in response to the timing signals 54a for instructing the player to move his/her left hand leftwards. Herein, a first motion of the player's left hand delays from the instruction timing by a time $\Delta_1$, while a second motion is made prior to the instruction timing by a time $\Delta_3$. In addition, the player actually moves his/her foot to the backward step position by a detection timing corresponding to the trigger pulse 55c in response to the timing signal 54c for instructing the player to move his/her foot to the backward step position. Herein, a step motion of the player's foot delays from the instruction timing by a time $\Delta_2$. Further, the player actually moves his/her right hand rightwards at a detection timing corresponding to the trigger pulse 55g in response to the timing signal 54g for instructing the player to move his/her right hand rightwards. Herein, a motion of the player's right hand delays from the instruction timing by a time $\Delta_4$.

It is possible to count failure events, in which the player fails to move prescribed parts of his/her body or the player makes fault motions, in evaluation results. Such failure events are counted when the transmission type sensors do not output trigger signals in response to physical motion state instruction timings, or they are counted when the transmission type sensors output trigger signals although the apparatus does not designate physical motion state instruction timings.

The physical motion state evaluation section 31 marks scores for player's physical motion states during the game in progress in response to a degree of coincidence (or matches) between instruction timings and detection timings.

That is, the physical motion state evaluation section 31 evaluates the player's physical motion states based on deviation values output from the comparators 21 to 24 or based on failure events, each of which is counted when at least one of the instruction timing and detection timing lacks with regard to each of the player's physical motion states. Herein, the evaluation is made with reference to a lookup table (not shown) in response to the deviation values or their absolute values (where no distinction is made between time delay and time gain). Alternatively, the deviation values are processed by calculations, in other words, addition and/or subtraction is carried out in response to the deviation values. Or, scores are merely accumulated without effecting addition and/or subtraction on the deviation values. After completion of playback of a single musical tune, the apparatus outputs a final evaluation result indicating a total point of score being marked for the player's physical motion states.

The present embodiment is designed to perform auditory presentation using the evaluation output tune data with respect to evaluation results of the physical motion state evaluation section 31 shown in FIG. 4.

In FIG. 6C, specific musical tone data are assigned to each of the instruction timing signals. For example, different tone pitches are respectively assigned to the instruction timing signals 54a for instructing the player to move his/her left hand leftwards. That is, a tone pitch $C_4$ is assigned to a first instruction timing signal 54a, while a tone pitch $B_3$ is assigned to a second instruction timing signal 54a. In addition, a tone pitch $A_3$ is assigned to an instruction timing signal 54c for instructing the player to move his/her foot to the backward step position on the foot switch unit 3. Further, a tone pitch $C_4$ is assigned to an instruction timing signal 54g for instructing the player to move his/her right hand rightwards. Besides, each of the instruction timing signals is accompanied with a specific tone generation range within which a specific musical tone is to be generated.

Now, a description will be given with respect to the instruction timing signal 54g in connection with its tone generation range. Namely, a reference numeral 56g designates a start time of the tone generation range, and a reference numeral 57g designates an end time of the tone generation range. As shown in FIG. 6D, the apparatus detects a rightward motion of the player's right hand to output a trigger pulse 55g at a timing that belongs to the aforementioned tone generation range of the timing signal 54g. Hence, the apparatus proceeds to generation of a musical tone having a tone pitch $C_4$. FIG. 6D also show that all of trigger pulses 55a, 55c belong to tone generation ranges of the timing signals 54a, 54c respectively. As a result, the apparatus proceeds to generation of musical tones having tone pitches $C_4$, $A_3$, $B_3$, $C_4$, which are generated at timings of the trigger pulses 54a, 54c, 54a, 54g respectively. Therefore, the musical tone generator 34 generates musical tone signals corresponding to the aforementioned musical tones.

By listening to a series of the musical tones being sequentially generated, the player is able to recognize time deviations from instruction timings with respect to physical motion state instructions.

It is possible to store time data representing the start time and end time of the tone generation range together with its corresponding physical motion state instruction in the sequence data storage 25. In that case, it is possible to arbitrarily set or change a time length of the tone generation range as well as a position of the instruction timing within the tone generation range. Instead of storing the time data representing the start time and end time of the tone generation range with respect to each instruction timing, it is possible to store a time length (or note length), which is counted from a preceding instruction timing to a following instruction timing, in the sequence data storage 25. In that case, a certain length is calculated in proportion to the aforementioned time length, so that the calculated length (e.g., a half of the time length) is provided before and after the instruction timing to form its tone generation range.

FIG. 6C shows that adjacent (or cross-related) tone generation ranges partially overlap with each other on the time axis with respect to physical motion state instructions. Of course, it is possible to set instruction timings such that adjacent tone generation ranges do not overlap with each other or they entirely overlap with each other on the time axis.

Next, a concrete example of the auditory presentation using the evaluation output tune data will be described in accordance with the first embodiment with reference to FIGS. 7A to 7E.

Figure 7A:
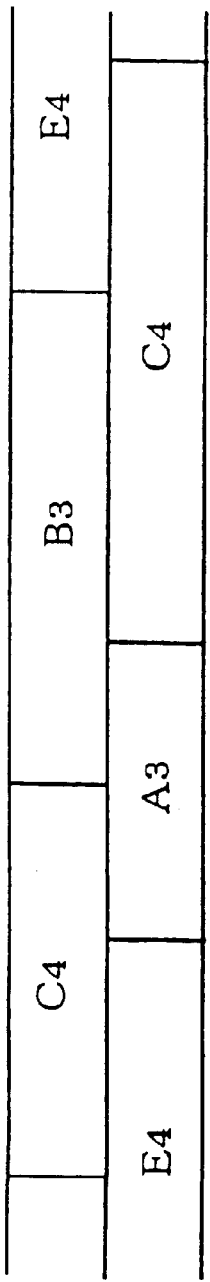
FIG. 7A is a time chart showing a series of tone generation ranges with regard to instruction timing signals for instructing a player to move his/her right hand rightwards.
Figure 7B:
FIG. 7B is a time chart showing a series of tone generation ranges with regard to instruction timing signals for instructing the player to move his/her left hand leftwards.

FIG. 7A shows a series of tone generation ranges that are set for instruction timing signals 54g for instructing the player to move his/her right hand rightwards, wherein tone pitches $C_4$, $B_3$ and $E_4$ are designated respectively. FIG. 7B shows a series of tone generation ranges that are set for instruction timing signals 54a for instructing the player to move his/her left hand leftwards, wherein tone pitches $E_4$, $A_3$ and $C_4$ are designated respectively. The tone generation ranges shown in FIGS. 7A and 7B overlap with each other on the time axis.

Figure 7C:
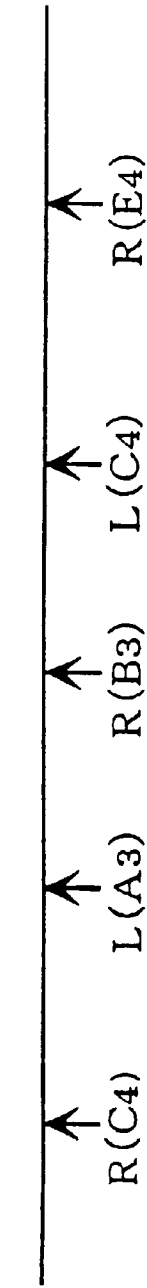
FIG. 7C is a time chart showing detection timings at which player's hand motions are detected precisely in conformity with the tone generation ranges shown in FIGS. 7A and 7B.
Figure 7D:
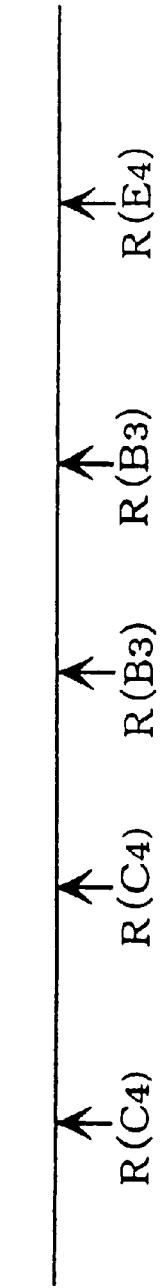
FIG. 7D is a time chart showing detection timings at which player's right hand motions are detected and are made falsely in comparison with the tone generation ranges shown in FIG. 7A.
Figure 7E:
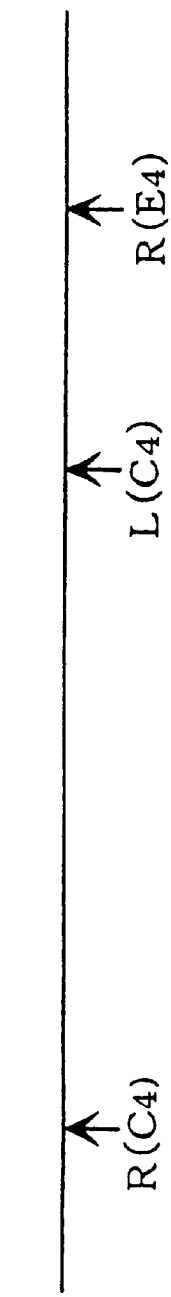
FIG. 7E is a time chart showing detection timings at which player's hand motions are detected but are made by disregarding some instructions.

FIGS. 7C–7E show trigger pulses (see upward arrows) corresponding to detection timings of player's physical motion states as instructed, wherein a reference symbol 'R' described below the arrow is used to represent detection of a rightward moving motion of the player's right hand, and 'L' is used to represent a leftward moving motion of the player's left hand. Each of the aforementioned reference symbols R, L is accompanied with representation of a tone pitch in parenthesis.

Specifically, FIG. 7C shows a series of trigger pulses corresponding to detection timings at which the player precisely moves his/her right and left hands as instructed by the apparatus, wherein trigger pulses $R(C_4)$, $L(A_3)$, $R(B_3)$, $L(C_4)$ and $R(E_4)$ are consecutively arranged in conformity with the tone generation ranges shown in FIGS. 7A, 7B. In this case, the apparatus generates a series of musical tones having the aforementioned tone pitches $C_4$, $A_3$, $B_3$, $C_4$ and $E_4$. That is, the apparatus accurately plays a melody consisting of the musical tones that are designated in advance. However, those musical tones are generated at the detection timings, which may be slightly deviated from the instruction timings.

FIG. 7D shows a series of trigger pulses corresponding to detection timings at which the player repeatedly moves his/her right hand rightwards multiple times in conformity with the tone generation ranges shown in FIG. 7A. In this case, the apparatus generates a series of musical tones having tone pitches $C_4$, $C_4$, $B_3$, $B_3$ and $E_4$, all of which conform with the tone pitches designated for rightward motions of the player's right hand. However, an arrangement of the aforementioned musical tones differs from the instructed melody. That is, the apparatus plays an incorrect melody in response to the player's right hand motions.

FIG. 7E shows a series of trigger pulses corresponding to detection timings at which the player moves his/her hands in a clumsy manner to disregard some physical motion instructions shown in FIGS. 7A, 7B. In this case, the apparatus generates only three musical tones having tone pitches $C_4$, $C_4$ and $E_4$, which differ from the instructed melody. Hence, the apparatus plays an incorrect melody in response to the player's hand motions.

As described above, when the player makes errors in moving his/her hands or disregards some instructions, the apparatus plays an incorrect melody that differs from the instructed melody. By recognizing incorrectness of the melody, the player is able to sense deviations between player's actual hand motions and physical motion instructions given from the apparatus.

In the aforementioned example of FIGS. 7A, 7B, instruction timings for the player's right and left hands are set such that their adjacent tone generation ranges partially overlap with each other. It is possible to set the instruction timings such that their tone generation ranges do not overlap with each other. In that case, there is a possibility in which no musical tone is generated in response to a trigger pulse departing from a prescribed tone generation range, or a musical tone having a tone pitch assigned to an adjacent tone generation range is falsely generated in response to a trigger pulse departing from a prescribed tone generation range. Therefore, the player recognizes errors of his/her hand motions by listening to an incorrect melody being played by the apparatus.

In the aforementioned examples, the evaluation output tune data are configured such that a series of tone pitches are respectively assigned to instruction timings, so that the player is capable of recognizing errors of his/her physical motions on the basis of incorrectness of the melody being played by the apparatus. Instead, it is possible to configure the evaluation output tune data such that a tone color of a false percussion instrument is assigned to a prescribed beat timing within a measure in connection with each of instruction timings. So, when the player makes a physical motion to produce a trigger pulse in conformity with the aforementioned beat timing within the measure by mistake, the apparatus generates a percussion sound of the false percussion instrument. Listening to such a percussion sound of the false percussion instrument, the player is able to recognize his/her incorrect physical motion whose timing deviates from the instructed timing.

Figure 8:
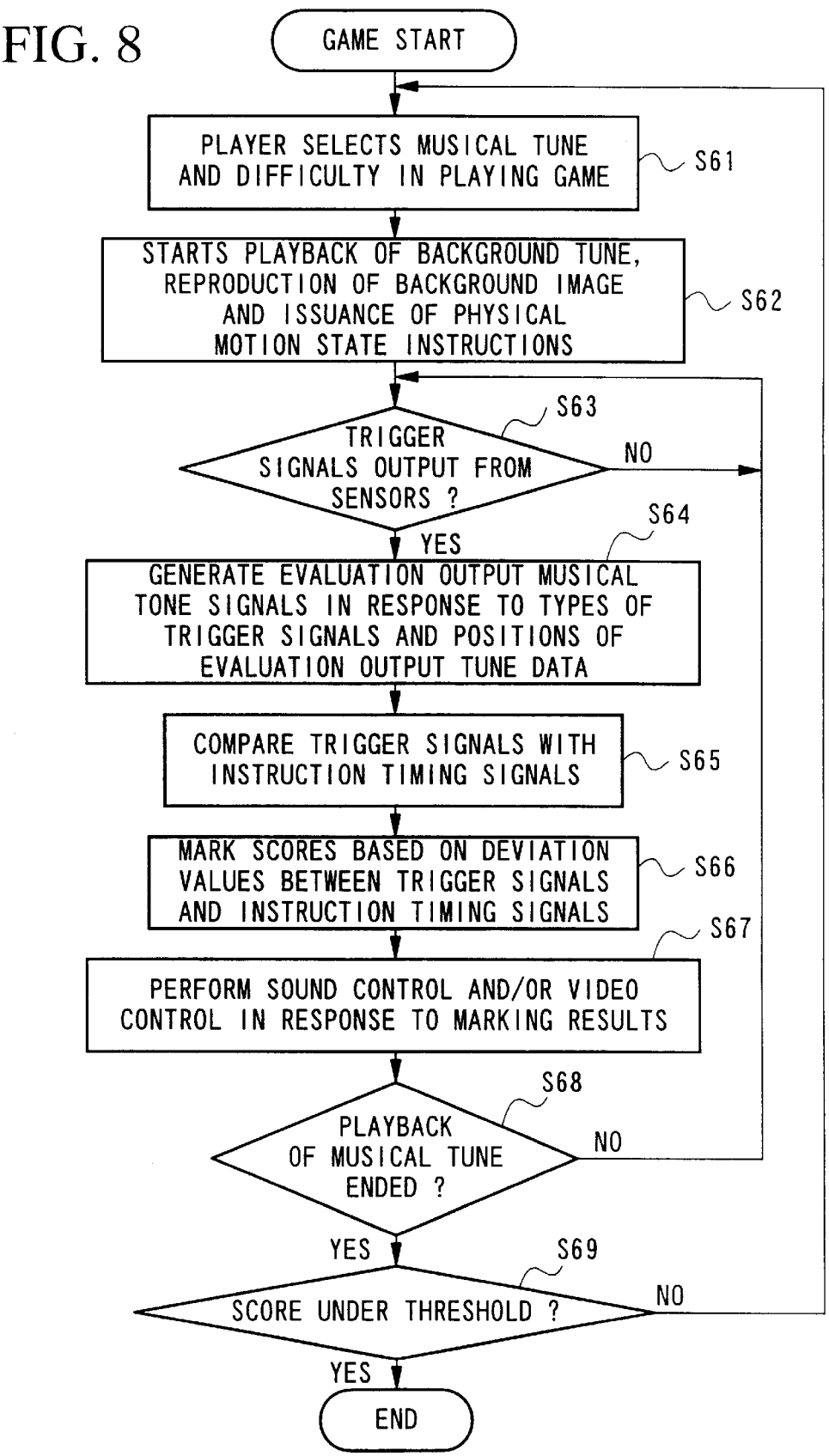
FIG. 8 is a flowchart for explaining operations of the apparatus of the first embodiment.

FIG. 8 shows a flowchart for explaining operations of the physical motion state evaluation apparatus in accordance with the first embodiment of the invention.

All of functions of blocks shown in FIG. 4 can be actualized by a microcomputer that runs programs. An outline of programs being executed by the microcomputer will be described with reference to FIG. 8.

Throwing a coin into a coin inlet of the apparatus, the player is able to start a music game. The display 2 shows on the screen a tune selection menu for listing various musical tunes and a difficulty setting menu for allowing the player to select a desired level of difficulty in playing the game. In step S61, the player operates buttons or controls on an operation panel (not shown) of the apparatus to select a desired musical tune (i.e., background tune) and a desired level of difficulty on the screen of the display 2. In step S62, the apparatus starts playing the background tune and reproduction of background images to be displayed on the screen of the display 2. In addition, the apparatus starts issuing physical motion instructions. In step S63, a decision is made as to whether sensors output trigger signals or not. If the trigger signals are output, the flow proceeds to step S64. If no trigger signal is output, the flow returns to the step S63.

In step S64, the apparatus discriminates types of the trigger signals, namely types of physical motion states which are detected in connection with physical motion state instructions being issued for prescribed parts of the player's body. In addition, the apparatus detects positions of evaluation output tune data, namely instruction timings being set for prescribed parts of the player's body. Thus, the apparatus generates evaluation output musical tone signals in response to the types of the trigger signals and positions of the evaluation output tune data, so that corresponding musical tones are generated.

In step S65, the apparatus compares the trigger signals for detecting physical motion states of the player's body and instruction timing signals for instructing the player to engage the physical motion states by prescribed parts of his/her body.

In step S66, the apparatus calculates deviation values between the trigger signals and instruction timing signals with respect to each of the prescribed parts of the player's body. Then, the apparatus performs evaluation on the player's physical motion states to mark a score on the basis of the deviation values. Herein, the apparatus marks a high score for the player if the deviation values are small. In addition, the apparatus does not increase the score if the deviation values are above prescribed thresholds, for example.

In step S67, the apparatus proceeds to presentation of evaluation results (i.e., scores being marked for the player) by effecting sound control and/or video control. For example, the apparatus displays prescribed characters or picture in response to the player's score on the screen of the display 2. In addition, the apparatus controls the musical tone generator 34 in response to the player's score. That is, the apparatus performs auditory presentation of the player's score by preset human voices or generates handclap sound or booing sound. Presentation of an evaluation result can be performed every time the apparatus detects a trigger signal. Instead, the presentation can be performed by units of measures respectively, or the presentation can be performed by units of phrases respectively. Alternatively, the presentation can be performed at an end of a musical tune being played by the apparatus. It is possible for the player to arbitrarily set a desired presentation timing.

In step S68, a decision is made as to whether the apparatus completes playback of a single musical tune or not. If the apparatus completes playback of the single musical tune, the flow proceeds to step S69. If not, the flow returns back to the step S63, so that the apparatus proceeds to detection of trigger signals again. In step S69, a decision is made as to whether the player's score is under a predetermined threshold or not. If the player's score is under the predetermined threshold, the apparatus automatically stops the game. If the player's score exceeds the threshold, the flow returns back to the step S61 again, so that the apparatus allows the player again to proceed to musical tune selection and difficulty selection on the screen of the display 2. That is, the apparatus allows the player to make setup for starting a game again.

The aforementioned flowchart of FIG. 8 is designed such that no increase nor decrease is made on the player's score with respect to player's misplay in which the player disregards a physical motion state instruction so that no trigger signal is detected for an instruction timing signal. However, the apparatus is designed to automatically terminate the game because it can be regarded that the player has no intention to continue the game when the apparatus detects no trigger signal for a prescribed time or more or when the apparatus does not detect trigger signals in response to instruction timing signals predetermined times or more.

The aforementioned step S63 is designed such that when a trigger signal is output from a sensor, it is compared with a correct instruction timing contained in tune data. Instead, it is possible to redesign the step S63 such that a decision is made as to whether a sensor outputs a trigger signal precisely in response to a correct instruction timing contained in tune data or not. In this case, it is possible to further redesign the step S63 such that a decision is made as to whether a sensor outputs trigger signals in response to a correct instruction timing and its proximal instruction timings or not. Herein, it is possible to set one proximal instruction timing before and after the correct instruction timing respectively, or it is possible to set multiple proximal instruction timings before and after the correct instruction timing respectively. Detecting deviations from the correct instruction timing and its proximal instruction timings, it is possible to reduce additional points being added to the player's score.

In the above description, the apparatus applies uniform weight of evaluation to each of player's physical motion states without consideration of types of sensors, namely detection subjects such as parts (e.g., foot, right hand, left hand) of the player's body which are subjects being sensed by different sensors respectively. It is possible to introduce different weights of evaluation for different detection subjects respectively. Herein, each of the detection subjects is not necessarily limited to one detection position, so it is possible to further provide different weights of evaluation for multiple detection positions (e.g., side positions, upward position) with respect to each of the detection subjects. For example, the foot switches are given relatively low points of score, while other sensors regarding left/right hand motions and kick motion are given relatively high points of score. In addition, it is possible to provide different criteria for evaluation of deviation values in consideration of the detection subjects and detection positions. For example, the foot switches are given relatively strict criteria for evaluation of deviation values by which player's feet deviate from instructed step positions, while other sensors regarding left/right hand motions and kick motion are given relatively soft criteria for evaluation of deviation values by which player's physical motion states deviate from instructed physical motion states.

Figure 9:
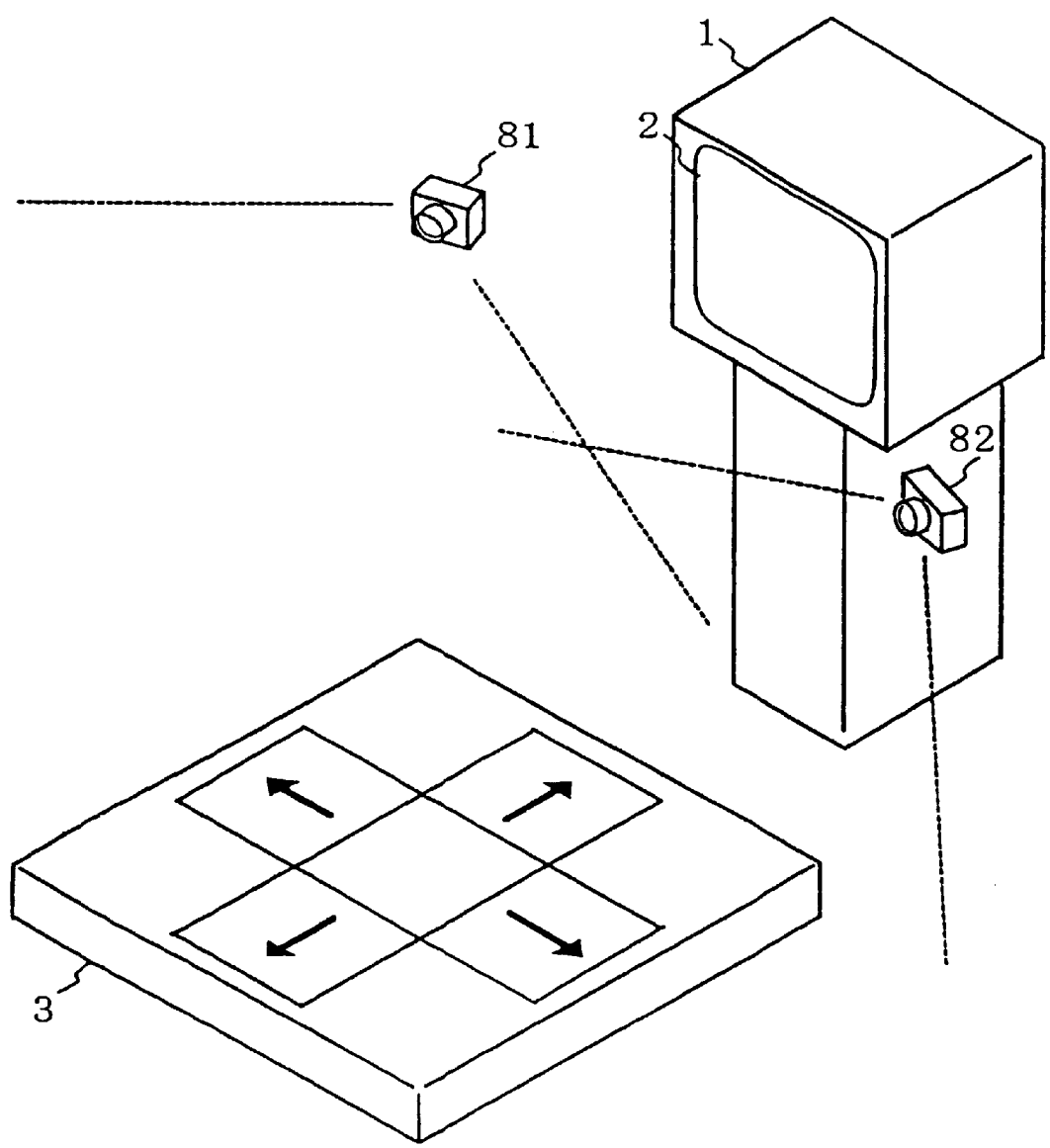
FIG. 9 is a perspective view showing an appearance of a physical motion state evaluation apparatus in accordance with a third embodiment of the invention.
Figure 10:
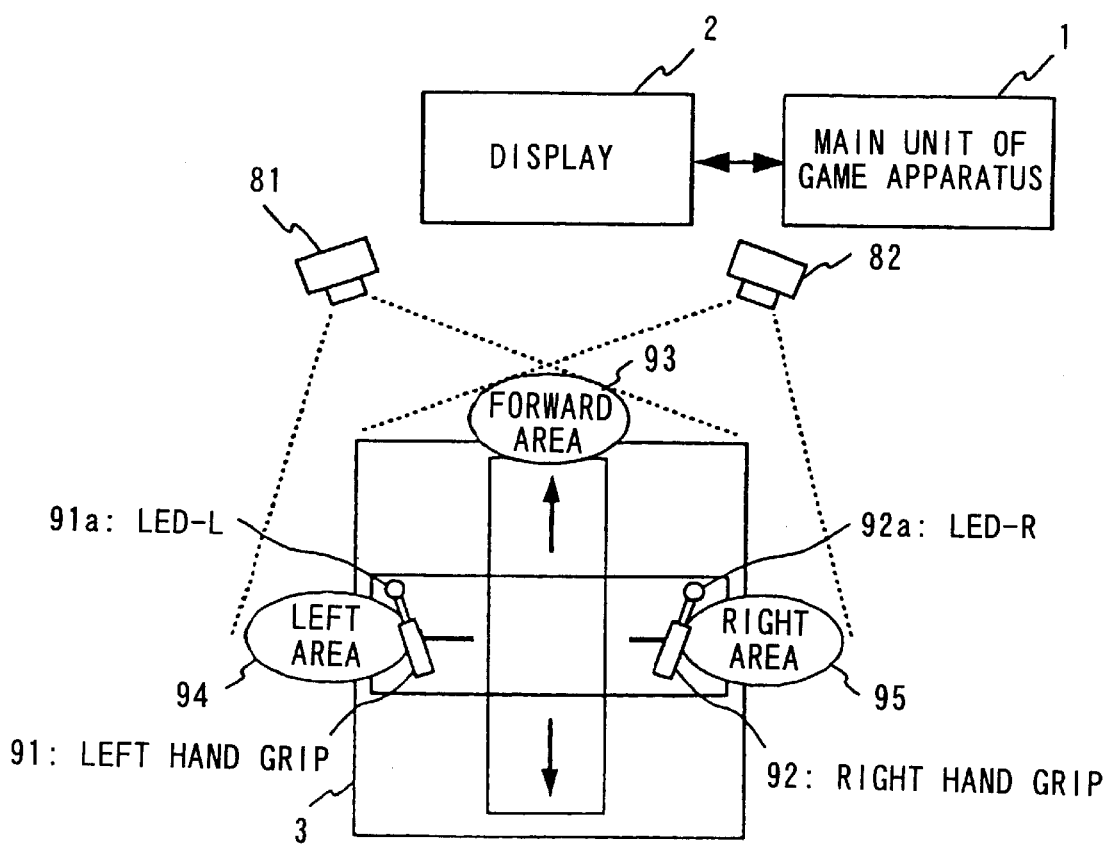
FIG. 10 is a plan view diagrammatically showing an arrangement of parts of the apparatus of the third embodiment.

FIG. 9 shows an appearance of a physical motion state evaluation apparatus in accordance with a third embodiment of the invention. FIG. 10 is a plan view diagrammatically showing an arrangement of parts of the physical motion state evaluation apparatus of the third embodiment.

The third embodiment is designed to use cameras for picking up pictures of at least one specific part of a player's body, so that the pictures are stored on a video memory. Herein, a player's physical motion state is detected by discriminating positional movement of at least one specific part of the player's body on the video memory. Detection regarding the specific part of the player's body is performed on objects such as hold members and wearing members that move three-dimensional space in connection with the specific part of the player's body.

In FIGS. 9 and 10, parts identical to those of the aforementioned figures are designated by the same reference numerals, hence, the description thereof will be omitted. A reference numeral 81 designates a digital camera that is located in a left forward direction, and a reference numeral 82 designates a digital camera that is located in a right forward direction. In FIG. 10, the apparatus also contains a left hand grip 91 coupled with a light emitting diode (LED-L) 91a as well as a right hand grip 92 coupled with a light emitting diode (LED-R) 92a. In addition, a forward area 93, a left area 94 and a right area 95 are arranged on a surface of the foot switch unit 3.

Using two digital cameras 81, 82, the apparatus follows up with movements of the LEDs 91a, 92a attached to the left hand grip 91 and right hand grip 92, which are held by player's left and right hands respectively. Thus, it is possible to detect physical motion states with respect to the player's left and right hands. Incidentally, the foot switch unit 3 is provided to detect player's step positions as similar to the foregoing embodiment shown in FIG. 1.

On the foot switch unit 3, there are provided three areas used for the purpose of player's motion detection at prescribed locates within each of photograph scope ranges of the digital cameras 81, 82. Namely, the forward area 93 is provided to detect player's hand motion states in which the player moves his/her left or right hand forward. The left area 94 is provided to detect player's left hand motion in which the player moves his/her left hand leftwards. The right area 95 is provided to detect player's right hand motion in which the player moves his/her right hand rightwards. The video memory stores pictures showing the LEDs 91a, 92a in connection with the aforementioned three areas. That is, left and right hand positions are detected on the video memory by determination as to which area the LEDs 91a, 92a are located.

Next, light emission timings of the LEDs 91a, 92a shown in FIG. 10 will be described in connection with photographing cycles of the digital cameras 81, 82 with reference to FIGS. 11A–11C.

The digital cameras 81, 82 open shutters for exposures for prescribed times (e.g., 1/60 second) by predetermined periods (e.g., 1/30 second). The LED-L 91a and LED-R 92a are alternately turned on in conformity with shutter open periods of the digital cameras 81, 82. The left hand grip 91 and right hand grip 92 are connected to the main body of the game apparatus by way of cables or by wireless communication or infrared light communication. Thus, light emission periods of the LEDs 91a, 92a are controlled in synchronization with each other.

Therefore, it is possible to discriminate light on pictures, which are photographed by the digital cameras 81, 82 and are stored in the video memory, in response to its light emission timing, which belongs to one of light emission timings of the LEDs 91a, 92a. That is, it is possible to detect a source of the light, which is one of the LEDs 91a, 92a. In short, it is possible to discriminate between a player's left hand position and a player's right hand position. By performing image processing on pictures photographed by the digital cameras 81, 82, the apparatus detects light emission positions on pictures stored in the video memory. Using correspondence between positions of the LEDs 91a, 92a on the pictures photographed by the digital cameras 81, 82, the apparatus locates those positions in a three-dimensional manner based on angular trigonometry. That is, it is possible to locate each of the LEDs 91*a*, 92*a*, each of which belongs to the forward area 93, left area 94 or right area 95.

The apparatus generates a trigger signal upon detection that each LED belongs to any of the aforementioned areas. Herein, the apparatus can generate a trigger signal instantaneously when the LED just enters into the area. Or, the apparatus can generate a trigger signal at a timing when player's hand motion substantially and temporarily stops in the area.

It is possible to propose various methods for detection of temporary stop of the LED in the area. For example, the detection can be implemented by comparison between a present position and a previous position that are consecutively detected for the LED in the area. So, the apparatus detects a temporary stop of the LED in the area when a deviation value between those positions become zero substantially or when a deviation value becomes lower than a threshold.

Alternatively, the detection can be implemented by calculating moving speed of the LED in the area. So, the apparatus detects a temporary stop of the LED in the area when the moving speed becomes zero substantially or when the moving speed becomes lower than a threshold. Instead of the moving speed, it is possible to use moving acceleration of the LED in the area. Herein, the apparatus detects a temporary stop of the LED in the area when the moving acceleration is reversed in polarity.

Because the third embodiment uses two digital cameras 81, 82, it is possible to additionally set upward and downward areas in addition to the forward, backward, left and right areas on the foot switch unit 3. It is possible to provide a single digital camera by which positions of the LEDs 91*a*, 92*a* attached to the player's left and right hands are detected within a two-dimensional area, which is divided into forward, backward, left and right areas.

As described above, the third embodiment is designed such that the LEDs 91*a*, 92*a* attached to the grips 91, 92, which are respectively held by the player's left and right hands, are turned on at different light emission timings respectively. Discrimination of the LEDs 91*a*, 92*a* is not necessarily made by changing the light emission timings. For example, the discrimination can be made by applying different flashing periods or different colors of light (e.g., different wavelengths) to the LEDs 91*a*, 92*a* respectively. Instead of changing light emission characteristics of the LEDs 91*a*, 92*a*, it is possible to apply different colors to surfaces of the grips 91, 92, so that player's left and right hand motions are discriminated by detecting colors of the grips 91, 92. Or, it is possible to apply different patterns or designs to surfaces of the grips 91, 92. In that case, the apparatus using the digital camera introduces pattern recognition to discriminate the player's left and right hand motions based on differences between the grips 91 and 92 in pattern, design and shape, for example.

Incidentally, it is possible to introduce ornaments such as rings and belts being attached to prescribed parts of the player's body such as wrists, ankles, head, feet (or footwear), wherein different colors are applied to the ornaments to allow discrimination by the digital camera. That is, the apparatus using the digital camera can discriminate the prescribed parts of the player's body to which the ornaments having different colors are attached.

Next, an example of a display image of the display 2 will be described in accordance with the third embodiment with reference to FIG. 12.

Figure 12:
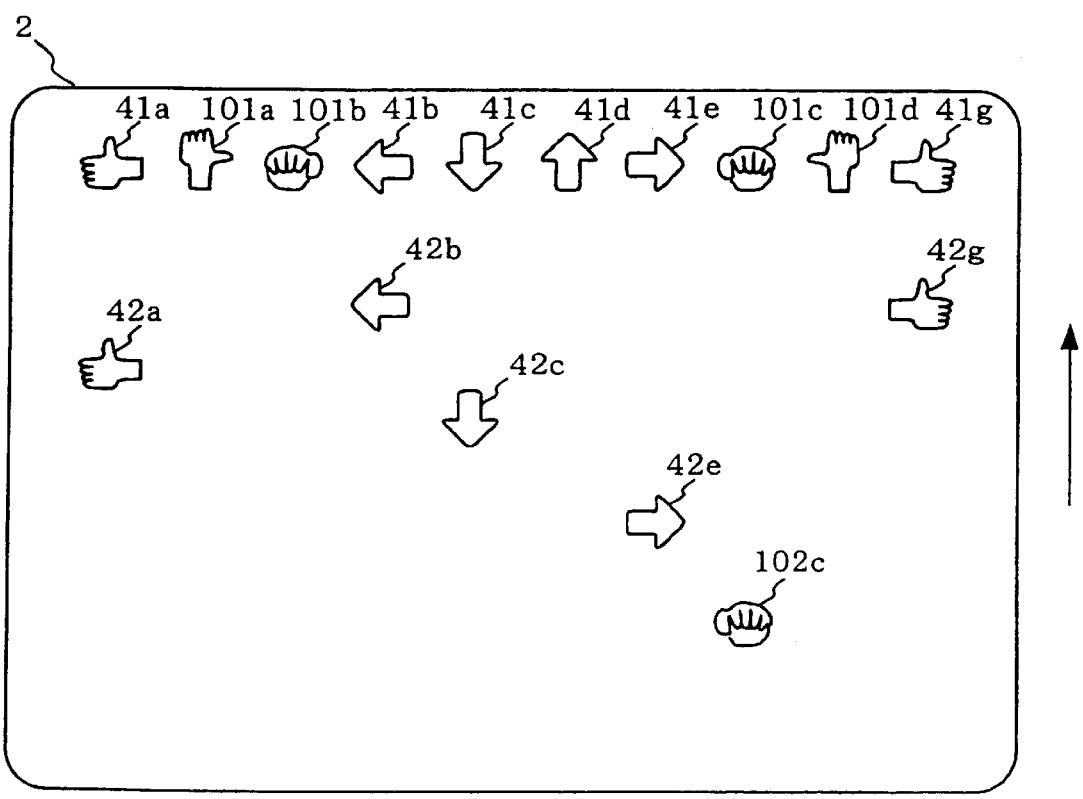
FIG. 12 shows an example of a display image displayed on the screen of the display in accordance with the third embodiment of the invention.

In FIG. 12, parts corresponding to those shown in FIG. 5 are designated by the same reference numerals, hence, the description thereof will be omitted. The third embodiment introduces new fixed symbols 101*a* to 101*d* in addition to the foregoing fixed symbols 41*a* to 41*g* being aligned on the top place of the screen of the display. Namely, a fixed symbol 101*a* instructs the player to move his/her left hand upward; a fixed symbol 101*b* instructs the player to move his/her left hand forward; a fixed symbol 101*c* instructs the player to move his/her right hand forward; and a fixed symbol 110*d* instructs the player to move his/her right hand upward.

The third embodiment additionally provides physical motion state instruction symbols 102, which sequentially emerge in a lowest place of the screen in a time order in connection with the fixed symbols 101*a*–101*d* respectively and each of which is scrolled vertically over a lapse of time on the screen of the display 2. FIG. 12 shows merely an example of the symbols 102, namely a physical motion state instruction symbol 102*c* that instructs the player to move his/her right hand forward. Each of the physical motion state instruction symbols emerges in the lowest place of the screen and then scrolls upward over a lapse of time to match with each of the fixed symbols. Hence, the apparatus instructs the player to perform the instructed physical motion states at instruction timings, at which the physical motion state instruction symbols overlap with the fixed symbols on the screen of the display 2, as precisely as possible.

The physical motion state evaluation apparatus of the third embodiment is described above with reference to FIGS. 11A–11C and FIG. 12. The third embodiment differs from the foregoing first embodiment, which is described with reference to FIGS. 1 and 2, by types of sensors for use in detection of physical motion states of prescribed parts of the player's body.

Therefore, the third embodiment can be easily actualized by merely changing the sensors in function block configurations that are shown in FIG. 4 to realize evaluation functions for physical motion states. In addition, operations regarding game play and evaluation can be easily actualized on the third embodiment in accordance with the flowchart of FIG. 8.

The physical motion state evaluation apparatus of the present invention is suitable for use in amusement systems of dance-type music games and dance training systems.

Other than the aforementioned systems, the present invention is applicable to a wide range of uses such as instruments or systems for use in health improvements, rehabilitation support training systems and physical therapy support systems by which users are able to restore their physical abilities while enjoying physical motions. In the use of the physical therapy support system, it is preferable that the user is able to arbitrarily set a tempo of tune data and a tempo of physical motion state instructions. In the user of the rehabilitation support training system in which the user is required to move his/her body entirely, it may be necessary to provide a number of foot switch units each incorporating a single foot switch and each having a prescribed size. That is, the foot switch units are arranged on the floor in a concentrated manner or a distributed manner, so that the foot switch is turned on when the user steps on the foot switch unit.

In the user of the physical therapy support system that is designed exclusively for arms of the user, the apparatus is redesigned to exclude the foot switch unit so that evaluation is performed only on user's hand motion states.

The present invention can be realized on game machines that are arranged in computer game facilities called game centers. In addition, the present invention can be realized on home-use game devices or personal computers, wherein the display is realized by television receivers or monitors of personal computers, for example.

Programs actualizing functions of the present invention can be installed in the apparatus by using external storage media such as the ROM cartridge and CD-ROM. Or, it is possible to download the programs from the server via the network, so that the downloaded programs are installed in the apparatus. The aforementioned first and second embodiments need specifically designed devices or switches as the foot switches and sensors for detecting user's hand positions, while the third embodiment using the digital camera can be designed to use general-use devices by introducing software image processing.

The aforementioned embodiments are designed such that the physical motion state instruction data are directly stored in the sequence data storage 25. Instead, it is possible to download the physical motion state instruction data from the server via the network, so that the downloaded data are transferred to the hard-disk unit or RAM, or they are subjected to direct streaming reproduction.

As described heretofore, the present invention has a variety of technical features and effects, which will be described below.

(1) A physical motion state evaluation apparatus is designed to reflect user's hand motions and kick motion, which cannot be conventionally detected by the mechanical sensors, on evaluation regarding user's physical motion states as compared with instructed physical motion states. Because the user's hand motions and kick motion are detected within a three-dimensional space in a non-contact manner, there is an effect that the apparatus does not impart feelings of wrongness to the user. As the user's hand motions, the user moves his/her left and/or right hands to upward, forward, backward, left and right positions. As the user's foot motions, the user moves his/her left or right foot to a forward, left or right position.

(2) The apparatus allows the user to perform swing motions of hands and kick motions of feet in synchronization with music rhythm in a dance-type music game. Therefore, the apparatus evaluates user's dance performance in response to user's hand motions in addition to user's step motions (or step timings). That is, the apparatus can precisely evaluate real dancing motions, so that some players can compete with each other in dancing techniques. To gain a high evaluation result, the player should move his/her hands at instructed timings as precisely as possible, hence, the player intends to imitate a good dance action by the apparatus.

(3) The apparatus provides detection timings at which prescribed parts (e.g., left/right hands, feet) of the user's body are moved and then temporarily stopped at instructed positions, so that evaluation results are provided based on deviation values by which the detection timings deviate from instruction timings. Hence, the apparatus can discriminate only user's intended physical motions while excluding instantaneous or accidental motions, so it is possible to perform precise evaluation on the user's physical motion states.

(4) In auditory presentation in which musical tones corresponding to constituent notes of a melody are sequentially generated in response to detection of the user's physical motion states that match with physical motion state instructions, the user is able to recognize errors of his/her physical motion states in comparison with the physical motion state instructions by listening whether the melody is correctly played or not.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A physical motion state evaluation apparatus comprising:

a physical motion state instruction device for successively outputting physical motion state instructions over a lapse of time with respect to at least a prescribed part of a user's body, wherein the physical motion state instructions request a user to move the prescribed part of the user's body to instructed positions at instruction timings respectively;

a physical motion state detector for successively detecting in a non-contact manner that the prescribed part of the user's body moves to the instructed positions at detection timings;

an evaluation output device for outputting evaluation results through evaluation based on deviation values between the instruction timings and the detection timings with respect to the prescribed part of the user's body.

2. A physical motion state evaluation apparatus according to claim 1 wherein the physical motion state instruction device instructs the user to move the prescribed part of the user's body to an instructed position designated by a physical motion state instruction at an instruction timing, while the physical motion state detector provides a detection timing upon detection of a temporary stop event in which the user temporarily stops the prescribed part of the user's body at the instructed position, so that the evaluation output device provides an evaluation result through evaluation based on a deviation value between the instruction timing and the detection timing with respect to the prescribed part of the user's body.

3. A physical motion state evaluation apparatus according to claim 1 wherein the physical motion state detector is of a transmission type configured by a projector unit and a receiver unit between which linear propagation of physical agent such as light and sound is caused, so that the receiver unit detects a shutoff event in which the linear propagation of the physical agent is shut off by a prescribed part of the user's body.

4. A physical motion state evaluation apparatus according to claim 1 wherein the physical motion state detector is of a reflection type configured by a projector unit and a receiver unit between which linear propagation of physical agent such as light and sound is caused, so that the receiver unit detects that the physical agent is reflected by a prescribed part of the user's body.

5. A physical motion state evaluation apparatus according to claim 1 wherein the physical motion state detector is of an image pickup type configured by an image pickup unit and an image analysis unit, so that the image analysis unit detects a motion state of the prescribed part of the user's body contained in images being picked up by the image pickup unit.

6. A physical motion state evaluation apparatus according to claim 1 further comprising a difficulty setting device for allowing the user to set a degree of difficulty so that the physical motion state instruction device outputs the physical motion state instructions to suit to the degree of difficulty.

7. A physical motion state evaluation apparatus according to claim 1 wherein the evaluation output device generates predetermined effect sound in response to the evaluation results.

8. A physical motion state evaluation apparatus comprising:
- a physical motion state instruction device for successively outputting physical motion state instructions over a lapse of time with respect to at least a prescribed part of a user's body, wherein the physical motion state instructions request a user to move the prescribed part of the user's body to instructed positions at instruction timings to which musical tone signals are respectively assigned, each instruction timing accompanied with a corresponding tone generation range;
- a physical motion state detector for successively detecting in a non-contact manner whether the prescribed part of the user's body moves to the instructed positions designated by the physical motion state instructions respectively, wherein the physical motion state detector provides detection timings when the user moves the prescribed part of the user's body to the instructed positions in conformity with the instruction timings; and
- an evaluation output device for discriminating whether each of the detection timings substantially matches with each of the tone generation ranges regarding the instruction timings, so that the evaluation output device proceeds to auditory presentation of evaluation results by generating the musical tone signals assigned to the tone generation ranges within which the detection timings emerge.

9. A physical motion state evaluation apparatus according to claim 8 wherein the physical motion state detector is of a transmission type configured by a projector unit and a receiver unit between which linear propagation of physical agent such as light and sound is caused, so that the receiver unit detects a shutoff event in which the linear propagation of the physical agent is shut off by a prescribed part of the user's body.

10. A physical motion state evaluation apparatus according to claim 8 wherein the physical motion state detector is of a reflection type configured by a projector unit and a receiver unit between which linear propagation of physical agent such as light and sound is caused, so that the receiver unit detects that the physical agent is reflected by a prescribed part of the user's body.

11. A physical motion state evaluation apparatus according to claim 8 wherein the physical motion state detector is of an image pickup type configured by an image pickup unit and an image analysis unit, so that the image analysis unit detects a motion state of the prescribed part of the user's body contained in images being picked up by the image pickup unit.

12. A physical motion state evaluation apparatus according to claim 8 further comprising a difficulty setting device for allowing the user to set a degree of difficulty so that the physical motion state instruction device outputs the physical motion state instructions to suit to the degree of difficulty.

13. A physical motion state evaluation apparatus according to claim 8 wherein the evaluation output device generates predetermined effect sound in response to the evaluation results.

14. A physical motion state evaluation apparatus according to claim 8 wherein the auditory presentation of the evaluation results cause generation of the musical tone signals representing musical tones that progress over a lapse of time.

15. A physical motion state evaluation apparatus according to claim 8 wherein the auditory presentation of the evaluation results cause generation of the musical tone signals representing constituent notes of a melody.

16. A physical motion state evaluation apparatus comprising:
- a physical motion state instruction device for successively outputting physical motion state instructions over a lapse of time with respect to at least user's hand and foot, wherein the physical motion state instructions request a user to move the user's hand and foot to instructed positions designated by the physical motion state instructions at instruction timings respectively;
- a plurality of physical motion state detectors for successively detecting positions of the user's hand and foot in comparison with the instructed positions, so that the physical motion state detectors provide detection timings when the user moves the user's hand and foot respectively to the instructed positions; and
- an evaluation output device for outputting evaluation results through evaluation based on deviation values between the instruction timings and the detection timings with respect to the user's hand and foot.

17. A physical motion state evaluation apparatus according to claim 16 wherein the physical motion state detector is of a transmission type configured by a projector unit and a receiver unit between which linear propagation of physical agent such as light and sound is caused, so that the receiver unit detects a shutoff event in which the linear propagation of the physical agent is shut off by a prescribed part of the user's body.

18. A physical motion state evaluation apparatus according to claim 16 wherein the physical motion state detector is of a reflection type configured by a projector unit and a receiver unit between which linear propagation of physical agent such as light and sound is caused, so that the receiver unit detects that the physical agent is reflected by a prescribed part of the user's body.

19. A physical motion state evaluation apparatus according to claim 16 wherein the physical motion state detector is of an image pickup type configured by an image pickup unit and an image analysis unit, so that the image analysis unit detects a motion state of the prescribed part of the user's body contained in images being picked up by the image pickup unit.

20. A physical motion state evaluation apparatus according to claim 16 further comprising a difficulty setting device for allowing the user to set a degree of difficulty so that the physical motion state instruction device outputs the physical motion state instructions to suit to the degree of difficulty.

21. A physical motion state evaluation apparatus according to claim 16 wherein the evaluation output device generates predetermined effect sound in response to the evaluation results.

22. A physical motion state evaluation apparatus comprising:
- a physical motion state instruction device for successively outputting physical motion state instructions over a lapse of time with respect to a first part and a second part of a user's body, wherein the physical motion state instructions instruct a user to move the first part and the second part of the user's body to first and second instructed positions designated by the physical motion state instructions at first and second instruction timings respectively;
- a first physical motion state detector for performing detection in a contact manner to provide a first detection timing at which the first part of the user's body moves to the first instructed position in conformity with the first instruction timing;

a second physical motion state detector for performing detection in a non-contact manner to provide a second detection timing at which the second part of the user's body moves to the second instructed position in conformity with the second instruction timing; and an evaluation output device for outputting evaluation results through evaluation based on a deviation value between the first detection timing and the first instruction timing as well as a deviation value between the second detection timing and the second instruction timing.

23. A physical motion state evaluation apparatus according to claim 22 wherein the physical motion state detector is of a transmission type configured by a projector unit and a receiver unit between which linear propagation of physical agent such as light and sound is caused, so that the receiver unit detects a shutoff event in which the linear propagation of the physical agent is shut off by a prescribed part of the user's body.

24. A physical motion state evaluation apparatus according to claim 22 wherein the physical motion state detector is of a reflection type configured by a projector unit and a receiver unit between which linear propagation of physical agent such as light and sound is caused, so that the receiver unit detects that the physical agent is reflected by a prescribed part of the user's body.

25. A physical motion state evaluation apparatus according to claim 22 wherein the physical motion state detector is of an image pickup type configured by an image pickup unit and an image analysis unit, so that the image analysis unit detects a motion state of the prescribed part of the user's body contained in images being picked up by the image pickup unit.

26. A physical motion state evaluation apparatus according to claim 22 further comprising a difficulty setting device for allowing the user to set a degree of difficulty so that the physical motion state instruction device outputs the physical motion state instructions to suit to the degree of difficulty.

27. A physical motion state evaluation apparatus according to claim 22 wherein the evaluation output device generates predetermined effect sound in response to the evaluation results.

28. A physical motion state evaluation apparatus comprising:

a first sensing unit for sensing a user's hand motion state;

a second sensing unit for sensing a user's foot motion state;

a storage for storing physical motion state instructions and tune data;

a display for displaying instructed positions for user's hand and foot respectively in response to the physical motion state instructions;

a musical tone generator for generating musical tones based on the tune data;

a physical motion state evaluation section for performing evaluation as to whether the user's hand and foot are moved to the instructed positions in connection with the musical tones; and an evaluation result presentation section for controlling at least one of the display to perform visual presentation of evaluation results and the musical tone generator to perform auditory presentation of evaluation results.

29. A physical motion state evaluation apparatus according to claim 28 wherein the first sensing unit is arranged in connection with the user's hand and is configured by a projector unit for projecting optical beams along optical axes and a receiver unit for receiving the optical beams respectively so that the receiver unit detects a shutoff event in which the user's hand shuts off at least one of the optical beams, and wherein the second sensing unit is arranged in connection with the user's foot and is configured by a projector unit for projecting optical beams along optical axes and a receiver unit for receiving the optical beams respectively so that the receiver unit detects a shutoff event in which the user's foot shuts off at least one of the optical beams.

30. A physical motion state evaluation apparatus according to claim 28 wherein the first sensing unit is arranged in connection with the user's hand and is configured by a projector unit for projecting optical beams along optical axes and a receiver unit for receiving the optical beams respectively so that the receiver unit detects a shutoff event in which the user's hand shuts off at least one of the optical beams, and wherein the second sensing unit is arranged horizontally under the user's foot to detect a step motion of the user's foot.

31. A physical motion state evaluation apparatus according to claim 28 wherein the physical motion state instructions request a user to move the user's hand and foot to first and second instructed positions at first and second instruction timings respectively, and wherein the first sensing unit provides a first detection timing at which the user's hand is moved to the first instructed position in conformity with the first instruction timing while the second sensing unit provides a second detection timing at which the user's foot is moved to the second instructed position in conformity with the second instruction timing, so that the physical motion state evaluation section provides evaluation results based on a first deviation value between the first instruction timing and the first detection timing as well as a second deviation value between the second instruction timing and the second detection timing.

32. A physical motion state evaluation apparatus according to claim 28 wherein the evaluation result presentation section controls the display to perform the visual presentation such that a score being marked for the user's hand motion and the user's foot motion is visually displayed on the basis of the evaluation results.

33. A physical motion state evaluation apparatus according to claim 28 wherein the evaluation result presentation section controls the musical tone generator to perform the auditory presentation such that the musical tones are generated in response to the evaluation results.

34. A physical motion state evaluation apparatus according to claim 28 wherein the physical motion state instructions allocate tone pitches corresponding to constituent notes of a prescribed melody to instruction timings at which a user is requested to move at least one of the user's hand and the user's foot to the instructed positions respectively and which have tone generation ranges respectively, so that the evaluation result presentation section controls the musical tone generator to generate musical tones having the tone pitches if at least one of the first sensing unit and the second sensing unit detects that the user's hand and the user's foot respectively is correctly moved to the instructed position within the tone generation range of the instruction timing.

* * * * *